United States Patent
Zhu

(10) Patent No.: US 12,144,024 B2
(45) Date of Patent: Nov. 12, 2024

(54) METHOD AND APPARATUS FOR DETERMINING REFERENCE TIME DOMAIN UNIT

(71) Applicant: XIAOMI COMMUNICATIONS CO., LTD., Beijing (CN)

(72) Inventor: Yajun Zhu, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 386 days.

(21) Appl. No.: 17/635,287

(22) PCT Filed: Aug. 16, 2019

(86) PCT No.: PCT/CN2019/101095
§ 371 (c)(1),
(2) Date: Feb. 14, 2022

(87) PCT Pub. No.: WO2021/030960
PCT Pub. Date: Feb. 25, 2021

(65) Prior Publication Data
US 2022/0295551 A1 Sep. 15, 2022

(51) Int. Cl.
*H04W 74/08* (2024.01)
*H04L 1/1812* (2023.01)
*H04W 16/14* (2009.01)
*H04W 74/0808* (2024.01)

(52) U.S. Cl.
CPC ....... *H04W 74/0808* (2013.01); *H04L 1/1812* (2013.01); *H04W 16/14* (2013.01)

(58) Field of Classification Search
CPC ............. H04W 74/0808; H04W 16/14; H04W 74/006; H04W 74/002; H04W 74/0833; H04L 1/1812; H04L 1/1822; H04L 1/1607
See application file for complete search history.

(56) References Cited

U.S. PATENT DOCUMENTS

| | | | | |
|---|---|---|---|---|
| 10,306,637 | B2 * | 5/2019 | Fukuta | H04W 72/04 |
| 2017/0238320 | A1 * | 8/2017 | Fukuta | H04W 72/0453 |
| | | | | 370/329 |
| 2018/0324821 | A1 * | 11/2018 | Dai | H04L 5/001 |

(Continued)

FOREIGN PATENT DOCUMENTS

| | | | |
|---|---|---|---|
| CN | 106656428 A | 5/2017 | |
| WO | WO 2019027271 A1 | 2/2019 | |
| WO | WO-2024093979 A1 * | 5/2024 | ........ H04W 74/0808 |

OTHER PUBLICATIONS

European Patent Application No. 22158876.7, Search and Opinion dated Aug. 19, 2022, 9 pages.

(Continued)

*Primary Examiner* — Jay P Patel
(74) *Attorney, Agent, or Firm* — Cozen O'Connor

(57) ABSTRACT

A method for determining a reference time domain unit in a wireless communications network includes determining the number of pieces of target information included in each time domain unit within a target channel occupation time. The target channel occupation time is a first channel occupation time just before a target device initiates channel detection. The method further includes determining a reference time domain unit according to the number of pieces of target information.

18 Claims, 6 Drawing Sheets

(56) References Cited

U.S. PATENT DOCUMENTS

2021/0298080 A1\* 9/2021 Wu .................... H04W 74/006

OTHER PUBLICATIONS

Russian Patent Application No. 2022106010 Office Action dated Aug. 31, 2022, 6 pages.
Russian Patent Application No. 2022106010 English translation of Office Action dated Aug. 31, 2022, 5 pages.
PCT/CN2019/101095 International Search Report, dated Apr. 26, 2020, 3 pages.

\* cited by examiner

"METHOD AND APPARATUS FOR
DETERMINING REFERENCE TIME
DOMAIN UNIT"

CROSS-REFERENCE TO RELATED
APPLICATION

This application is a national phase of International Application No. PCT/CN2019/101095, filed on Aug. 16, 2019, the content of which is hereby incorporated by reference in its entirety.

TECHNICAL FIELD

The disclosure relates to a field of communication technologies, and particularly to a method and an apparatus for determining a reference time domain unit.

BACKGROUND

In the development process of the wireless communication system, for the unlicensed spectrum, the Third Generation Partnership Project (3GPP) proposes a license assisted access (LAA) feature to allow communication devices to use unlicensed bands. That is, the use of unlicensed bands is assisted by licensed bands. This boosts the performance of the communication devices and optimizes the use of available wireless network resources.

SUMMARY

According to a first aspect of embodiments of the disclosure, a method for determining a reference time domain unit is provided. The device is applied to a target device operating on an unlicensed spectrum. The method includes:

determining the number of pieces of target information included in each time domain unit within a target channel occupation time (COT), in which the target COT is a first COT just before the target device initiates channel detection; and determining the reference time domain unit based on the number of pieces of target information.

According to a second aspect of embodiments of the disclosure, a non-transitory computer-readable storage medium is provided. The storage medium has a computer program stored thereon. The computer program is configured to execute the method for determining a reference time domain unit according to the first aspect.

According to a third aspect of embodiments of the disclosure, an apparatus for determining a reference time domain unit is provided. The apparatus is applied to a target device operating on an unlicensed spectrum. The apparatus includes: a processor and a memory for storing processor-executable instructions. The processor is configured to:

determine the number of pieces of target information included in each time domain unit within a target Channel Occupation Time (COT), in which the target COT is a first COT just before the target device initiates channel detection; and determine the reference time domain unit based on the number of pieces of target information.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
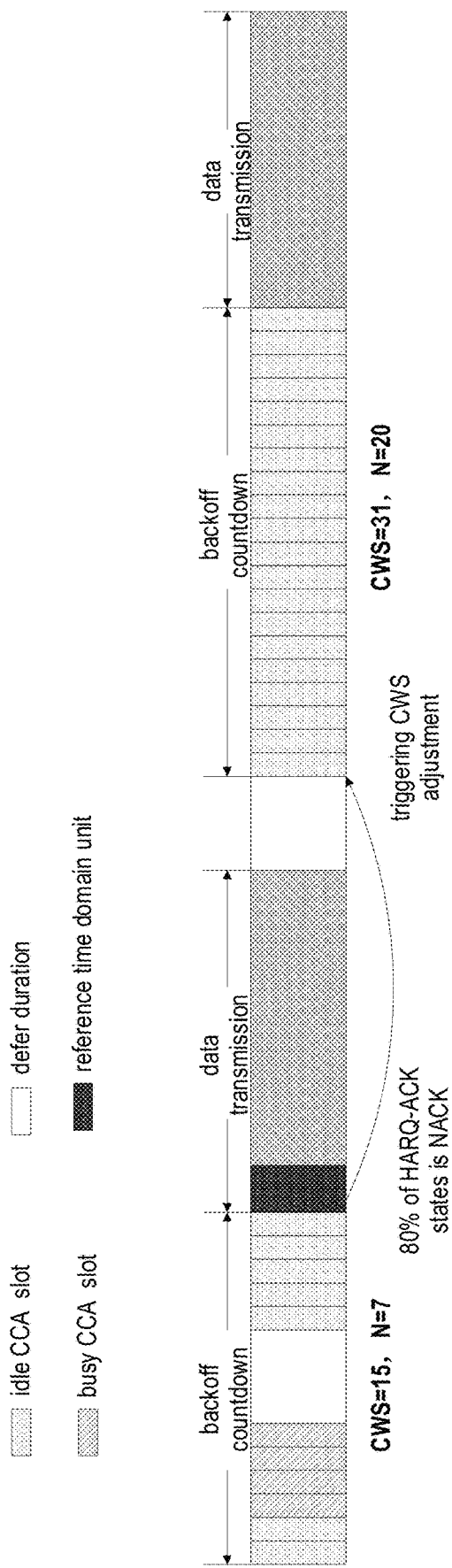
FIG. 1 is a schematic diagram illustrating a scenario for adjusting a value of CWS according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are for the purpose of describing particular embodiments only and are not intended to limit the disclosure. As used in this disclosure and the appended claims, the singular forms "a", "the" and "said" are intended to include the plural forms as well, unless the context clearly dictates otherwise. It will also be understood that the term "and/or" as used herein refers to and includes any and all possible combinations of one or more of the associated listed items.

It should be understood that although the terms "first", "second" and "third" may be used in this disclosure to describe various pieces of information, such information should not be limited by these terms. These terms are only used to distinguish the same type of information from each other. For example, the first information may also be referred to as the second information, and similarly, the second information may also be referred to as the first information, without departing from the scope of the disclosure. Depending on the context, the word "if" as used herein can be interpreted as "when", "while" or "in response to determining".

In order to ensure coexistence with other communication systems, such as a Wireless Fidelity (WiFi) system, on unlicensed bands, a mechanism for the channel detection prior to the data transmission is also introduced in the license assisted access (LAA) feature of a wireless communication network. When there is data to be sent, the transmitting end needs to detect whether the channel is idle. Only when the channel is idle, will the transmitting end send the data. Currently, there are various mechanisms for the channel detection. Taking the channel detection process of downlink transmission as an example, the mechanism for the channel detection of category4 (cat4) can be used.

The mechanism for the channel detection of cat4 is Clear Channel Assessment (CCA) based on random backoff. The wireless communication device generates a backoff counter N uniformly and randomly within a value range of [0, S], and performs channel monitoring based on a granularity of (slot), in which S is the value of Contention Window Size (CWS) which is a positive integer.

If it is detected that the channel is idle within the CCA slot, the value the backoff counter is reduced by one. Otherwise, if it is detected that the channel is busy within the CCA slot, the backoff counter is hold down, that is, the backoff counter N remains unchanged during the busy time period of the channel until detecting the channel is idle. The wireless communication device can immediately occupy the channel when the backoff counter is reduced to zero.

The value of CWS of the cat4 is dynamically adjusted. The wireless communication device dynamically adjusts the value of the CWS depending on whether previous transmissions are correctly received by the receiving end. In this way, an appropriate value of CWS can be obtained through adjustment based on the channel state and the network service load, and a compromise can be achieved between reducing collisions between transmitting nodes and improving channel access efficiency.

On the unlicensed band, the adjustment of detection parameters, such as the value of the CWS of the Listen Before Talk (LBT) cat4 is based on the Hybrid Automatic Repeat Request (HARQ) information. In related arts, for the downlink transmission, a reference sub-frame used to adjust the value of CWS is the first sub-frame in the latest downlink transmission just before the base station initiates the channel detection. However, in related arts, the HARQ information is transmitted on the licensed spectrum, which cannot be applied in New Radio-Unlicensed (NR-U).

In related arts, the value of CWS of the cat4 is dynamically adjusted. As illustrated in FIG. 1, the CWS that the base station competes for a first Channel Occupation Time (COT) is 15. In the HARQ feedbacks to the transmission of Physical Downlink Shared Channel (PDSCH) on the reference subframe during the first COT, if 80% of the HARQ-ACK states are Non-Acknowledgment (NACK), the base station increases the value of CWS to 31, and use this increased value of CWS to generate a random number N in the next competition for the channel occupation, so as to perform the channel monitoring.

The adjustment process of the value of CWS is provided as follows.

In step 1, in a case where there are multiple services and a priority of each service is p, where p∈{1, 2, 3, 4}, the value of the CWS corresponding to each service can be set as the minimum value among values of the CWS corresponding to the priority according to Table 1, i.e., $CWS_P = CWS_P$.

TABLE 1

| priority | value of CWS |
| --- | --- |
| 1 | s11, s12, s13 . . . |
| 2 | s21, s22, s23 . . . |
| 3 | s31, s32, s33 . . . |
| 4 | s41, s42, s43 . . . |

For example, if the priority corresponding to a service is 2, and the minimum value among s21, s22, s23 . . . is s21, the value of the CWS of the service can be set as s21. In step 2, for any LBT, if in all HARQ results corresponding to all PDSCHs received by the base station within the reference time domain unit k, at least 80% of the HARQ results are NACK, the $CWS_P$ corresponding to the priority p of each service is increased to a next higher value corresponding to the priority of the service in Table 1, and continue to execute the step 2.

Instead, if the number of NACKs in the HARQ results does not exceed 80%, return to the step 1, and the $CWS_P$ corresponding to the priority p of each service is decreased to a minimum value $CWS_{min,P}$ of the value of CWS corresponding to the priority of the service in Table 1.

The reference time domain unit k is the first time domain unit in the downlink transmission closest to the current moment sent by the base station on a current carrier, and the base station can expect to receive the HARQ result feedback to this time domain unit from the terminal.

In step 3, if the $CWS_P$ has been the maximum value $CWS_{max,P}$ of the CWS corresponding to the priority in Table 1, the next adjusted value of CWS is still CWS If the $CWS_P$ of a priority of a service reaches the maximum value $CWS_{max,P}$ all the time in K successive CWS value adjustments and backoff counter generations, the $CWS_P$ corresponding to the priority of the service is reset to the minimum value $CWS_{min,P}$, where the value of K is selected by the base station from the set of positive integers of {1, 2, . . . , 8}, and the value of K corresponding to the priority p of each service can be independently selected.

It can be seen that the adjustment of the value of CWS in related arts needs to be determined based on the HARQ information in the reference time domain unit. However, the HARQ is transmitted on the licensed spectrum and cannot be applied in the NR-U. In order to solve this technical problem, embodiments of the disclosure provide a method and an apparatus for determining a reference time domain unit.

Figure 2:
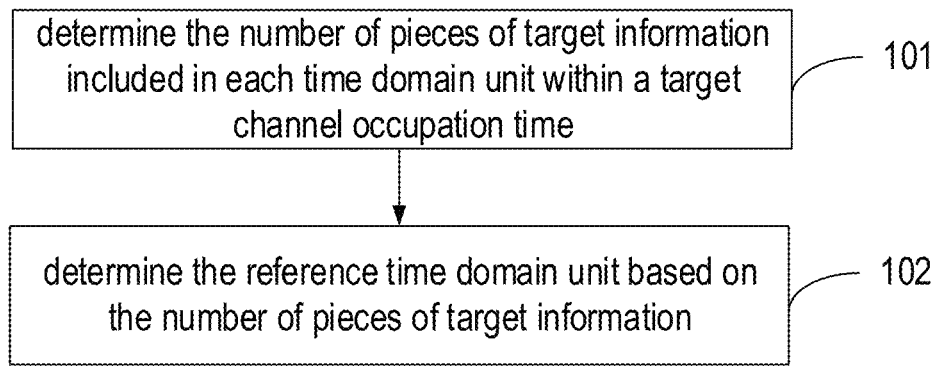
FIG. 2 is a flowchart illustrating a method for determining a reference time domain unit according to an exemplary embodiment.

As illustrated in FIG. 2, FIG. 2 is a flowchart illustrating a method for determining a reference time domain unit according to an embodiment. The method can be applied to a target device operating on an unlicensed spectrum. Optionally, the target device can be a base station. The method can include the following.

In block 101, the number of pieces of target information included in each time domain unit within a target COT is determined.

The target COT is a first COT just before the target device, i.e., the base station initiates channel detection. The time domain unit may be any unit in the time domain, optionally, a symbol, a slot, a sub-frame, or a radio frame, which is not limited in the disclosure. In embodiments of the disclosure, the target device may determine the unit of the time-domain unit in a manner pre-defined by the protocol, or may determine the unit of the time-domain unit by receiving a signaling. The disclosure does not limit the manner of determining the unit of the time domain unit.

In block 102, the reference time domain unit is determined based on the number of pieces of target information.

In above embodiments, the reference time domain unit for determining the value of CWS can be obtained on the unlicensed spectrum, so that the value of CWS can be adjusted accurately to improve the performance of the NR-U system.

In an embodiment, the target information may be downlink data information sent by the base station, and the downlink data information is configured to require the terminal side to feed back a HARQ result. Alternatively, the target information may be HARQ result information needed to be fed back by the terminal. Alternatively, the target information may be feedback information respectively corresponding to at least one HARQ process identifier. For example, the target information includes the feedback information respectively corresponding to HARQ process identifiers a, b, c, . . . . The feedback information may be information fed back by the terminal and corresponding to the process identifier, or information fed back by the base station and corresponding to the process identifier.

In above embodiments, on the unlicensed spectrum, the reference time domain unit may be determined based on the number of pieces of different target information, such that the value of CWS is adjusted accurately and the performance of the NR-U system is improved.

In an embodiment, if the target information includes the downlink data information that requires the terminal to feed back the HARQ result, the block 102 may be implemented in any one of the following manners.

In a first manner, a first time domain unit, within the target COT, that the number of pieces of the target information is greater than a preset threshold is determined as the reference time domain unit.

Figure 3:
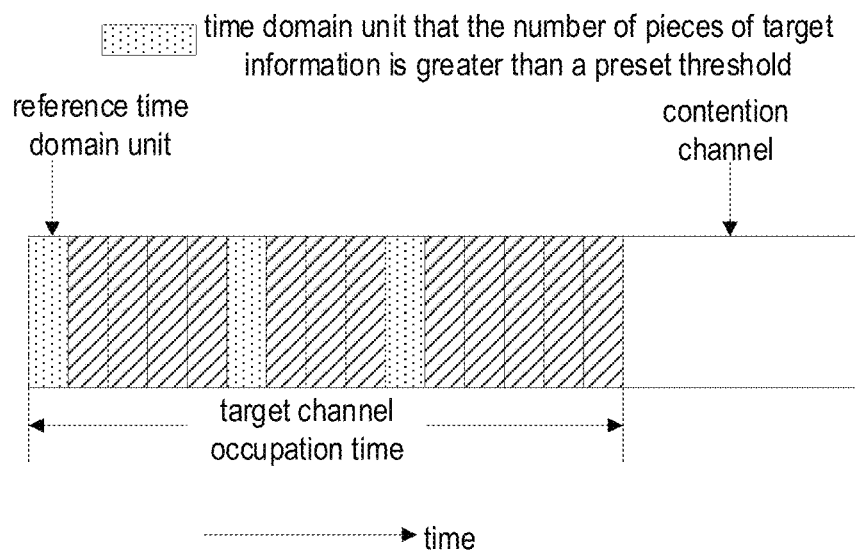
FIG. 3 is a schematic diagram illustrating a scenario for determining a reference time domain unit according to an exemplary embodiment.

As illustrated in FIG. 3, the target COT includes multiple time domain units. There may be one or more time domain units that the numbers of pieces of target information are greater than the preset threshold. If there are more than one time domain unit that the numbers of pieces of target information are greater than the preset threshold, the base station follows a predefined strategy. For example, the predefined strategy is that the reference time domain unit is the first time domain unit that the number of pieces of target information is greater than the preset threshold. The target device directly determines the first time domain unit that the number of pieces of the target information is greater than the preset threshold as the reference time domain unit.

For example, the preset threshold is represented by d, and d equals to 2. In this case, the reference time domain unit is a time domain unit, within the target COT, that the number of pieces of downlink data information requiring the terminal to feed back the HARQ result is greater than 2. When there are many reference time domain units that the numbers of pieces of downlink data information requiring the terminal to feed back the HARQ result are greater than 2, the base station follows the predefined strategy to determine the first one from the time domain units that the numbers of pieces of downlink data information requiring the terminal to feed back the HARQ result are greater than 2 as the reference time domain unit.

In the second manner, all the time domain units, within the target COT, that the number of pieces of target information is greater than the preset threshold are determined as the reference time domain units.

Figure 4:
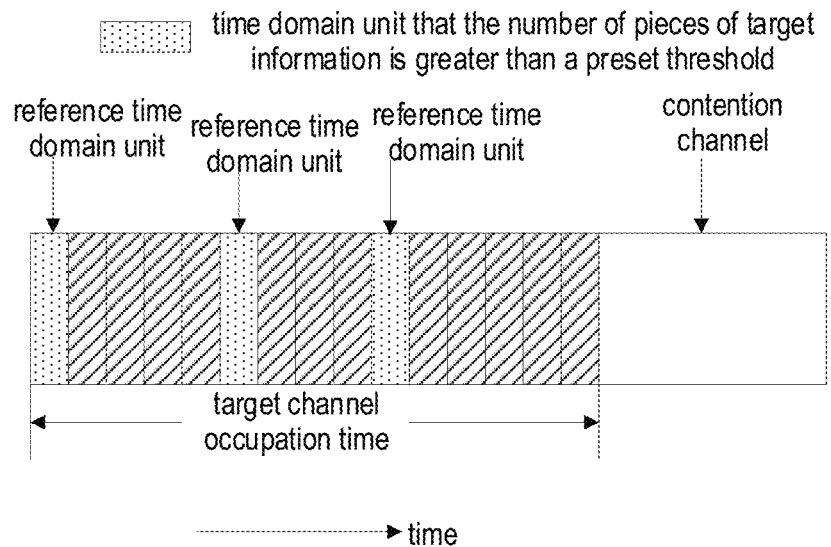
FIG. 4 is a schematic diagram illustrating another scenario for determining a reference time domain unit according to an exemplary embodiment.

As illustrated in FIG. 4, the target COT includes multiple time domain units. There may be one or more time domain units that the numbers of pieces of target information are greater than the preset threshold. The base station may follow a predefined strategy. For example, the predefined strategy is that the reference time domain unit is each of the time domain units that the numbers of pieces of target information are greater than the preset threshold. Therefore, the base station determines all the time domain units that the numbers of pieces of target information are greater than the preset threshold as the reference time domain units.

For example, the preset threshold is represented by d and d equals to 4. The reference time domain unit is a time domain unit, within the target COT, that the pieces of downlink data information requiring the terminal to feed back the HARQ result is greater than 4. When there are many reference time domain units that the numbers of pieces of downlink data information requiring the terminal to feed back the HARQ result are greater than 4, the base station follows the predefined strategy to determine all the time domain units that the numbers of pieces of downlink data information requiring the terminal to feed back the HARQ result are greater than 4 as the reference time domain units.

In a third manner, a time domain unit, within the COT, that the number of pieces of target information is maximum is determined as the reference time domain unit.

Figure 5:
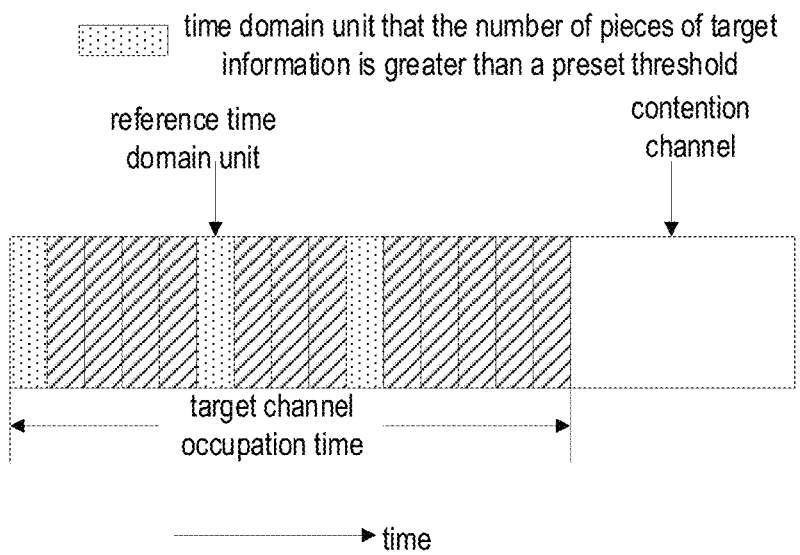
FIG. 5 is a schematic diagram illustrating another scenario for determining a reference time domain unit according to an exemplary embodiment.

As illustrated in FIG. 5, the target COT includes multiple time domain units, and there may be one or more time domain units that the numbers of pieces of target information are greater than the preset threshold. In this case, the base station may determine a time domain unit that the number of pieces of target information included is the maximum as the reference time domain unit based on a preset correspondence.

For example, the reference time domain unit is a time domain unit, within the target COT, that the number of downlink data information requiring the terminal to feed back the HARQ result is the maximum. If there are many time domain units that the numbers of pieces of downlink data information requiring the terminal to feed back the HARQ result are the same and are the maximum, e.g., the number is 4, the base station follows the predefined strategy to determine the first time domain unit that the number of pieces of download data information requiring the terminal to feed back the HARQ result is 4 as the target time domain unit, or determine all time domain units that the numbers of pieces of download data information requiring the terminal to feed back the HARQ result being the maximum, i.e., 4, as the target time domain units.

In above embodiments, when the target information includes the downlink data information that requires the terminal to feed back the HARQ result, the base station can flexibly determine the reference time domain unit through the above manners, to adjust the value of CWS accurately, to improve the performance of the NR-U system and to achieve high availability.

In an embodiment, if the target information includes the HARQ result information needed to be fed back by the terminal, the block 102 can be implemented in any one of the above three manners, and details are not repeated here.

As an example, the preset threshold is represented by d and d equals to 2. The reference time domain unit is a time-domain unit, within the target COT, that the number of pieces of HARQ result information needed to be fed back by the terminal is greater than 2. When there are multiple reference time domain units that the numbers of pieces of HARQ result information needed to be fed back by the terminal are greater than 2, the base station follows a predefined strategy to determine the first time domain unit that the number of pieces of HARQ result information needed to be fed back by the terminal is greater than 2 as the reference time domain unit.

As another example, the preset threshold is represented by d and d equals to 4. The base station can calculate the number of pieces of HARQ result information needed to be fed back by the terminal in each time domain unit, and the reference time domain unit is a time domain unit, within the target COT, that the number of pieces of HARQ result information needed to be fed back by the terminal is greater than 4. When there are multiple reference time domain units that the numbers of pieces of HARQ result information needed to be fed back by the terminal are greater than 4, the base station follows a predefined strategy to determine all the time domain units that the numbers of pieces of HARQ result information needed to be fed back by the terminal are greater than 4 as the reference time domain units.

As still another example, the base station may calculate the number of pieces of HARQ result information needed to be fed back by the terminal on each time domain unit.

A time domain unit, within the target COT, that the number of pieces of HARQ result information needed to be fed back by the terminal is the maximum is determined as the reference time domain unit. If there are multiple time domain units that the numbers of pieces HARQ result information needed to be fed back by the terminal are the same and the maximum, such as the number is 4, the base station can follow a predefined strategy to determine the first one of the time domain units that the numbers of pieces of HARQ result information needed to be fed back by the terminal are 4 as the target time domain unit, or determine all the time domain units that the numbers of pieces of HARQ result information needed to be fed back by the terminal are the maximum (i.e., 4) as the target time domain units. In embodiments of the disclosure, the preset threshold may be a positive integer, which is not limited in the disclosure.

In above embodiments, when the target information includes the HARQ result information needed to be fed back by the terminal, the base station can flexibly determine the reference time domain unit through the above manners, to adjust the value of the CWS accurately, to improve the NR-U system performance, and to achieve high availability.

In an embodiment, if the target information includes the feedback information respectively corresponding to the at least one HARQ process identifier, the base station may directly use all the time domain units including the target information as the reference time domain units, as illustrated in FIG. 4, the high availability is achieved.

Figure 6:
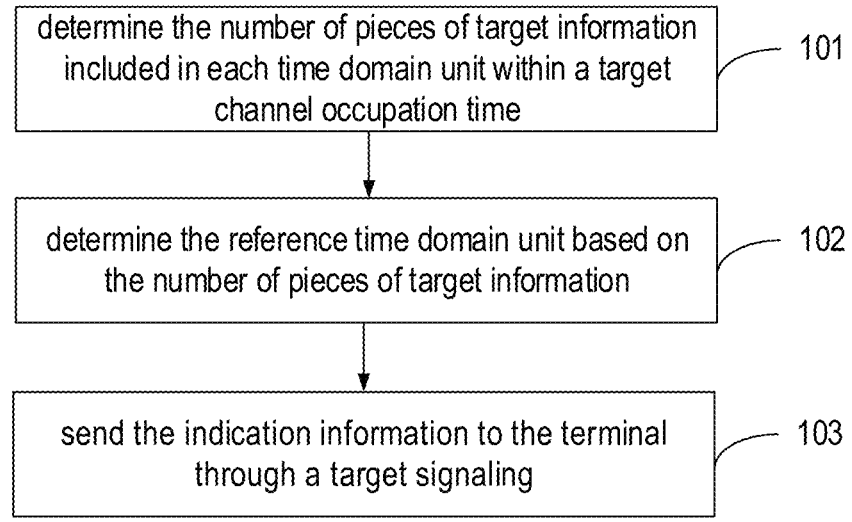
FIG. 6 is a flowchart illustrating another method for determining a reference time domain unit according to an exemplary embodiment.

For example, the target COT includes the feedback information respectively corresponding to HARQ process identifiers a, b, c, . . . , the base station may perform statistics analysis on the feedback information corresponding to the HARQ process identifier on each time domain unit within the target COT, and determine all the time domain units including the target information as the reference time domain units. In an embodiment, as illustrated in FIG. 6, FIG. 6 is a flowchart illustrating another method for transmitting data according to embodiments of FIG. 2, the method further includes the following.

In block 103, indication information is sent to the terminal through a target signaling. The indication information includes an identifier of the reference time domain unit, for example, a slot number corresponding to the reference time domain unit. Optionally, the target signaling may be a downlink scheduling signaling, a radio resource control (RRC) signaling or an MAC signaling, which is not limited in the disclosure.

When the target device is a base station, the base station can also notify the terminal through the indication information after determining the reference time domain unit. The terminal can know the location of the reference time domain unit based on the indication information in the target signaling, and determine a mechanism for the channel detection based on the target information carried in the reference time domain unit before the terminal sends the uplink data, thereby achieving the high availability.

In an embodiment, optionally, the target device may be a terminal, and the terminal executes the above blocks 101 to 102 to determine the number of pieces of target information included in each time domain unit within the target COT and determine the reference time domain unit through the predefined strategy based on the number of pieces of target information. The target COT is the first COT just before the terminal initiates channel detection. The determination method is the same as that of the base station side to determine the reference time domain unit, which will not be repeated here.

In addition, for determining, by the terminal, the reference time domain unit, in addition to the above method, the base station can execute the above blocks 101 to 102 to determine the reference time domain unit for the terminal, and send the indication information to the terminal through the target signaling, where the indication information includes the identifier of the reference time domain unit. The terminal directly determines the reference time domain unit based on the indication information sent by the base station.

In above embodiments, the terminal can determine the number of pieces of target information included in each time domain unit within the target COT by itself, and determine the reference time domain unit based on the number of pieces of target information. Alternatively, the base station may determine the reference time domain unit for the terminal, and the terminal may directly determine the reference time domain unit based on the indication information in the target signaling sent by the base station. The purpose of determining the reference time domain unit on the unlicensed spectrum is realized, the value of CWS is adjusted accurately, the performance of the NR-U system is improved, and the high availability is achieved.

Corresponding to the foregoing application function implementation method embodiments, the disclosure further provides an application function implementation device and an embodiment of a corresponding terminal.

Figure 7:
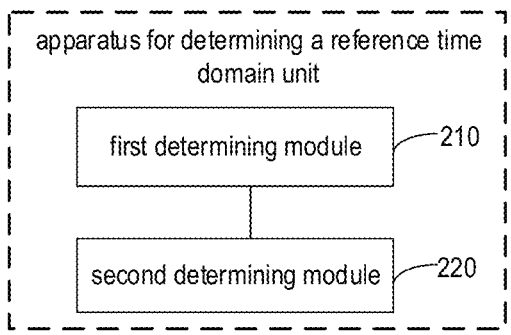
FIG. 7 is a block diagram illustrating an apparatus for determining a reference time domain unit according to an exemplary embodiment.

FIG. 7 is a block diagram illustrating an apparatus for determining a reference time domain unit according to an exemplary embodiment. The apparatus is applied for a target device operating on an unlicensed spectrum. The apparatus includes: a first determining module 210 and a second determining module 220.

The first determining module 210 is configured to determine the number of pieces of target information included in each time domain unit within a target channel occupation time (COT). The target COT is a first COT just before the target device initiates channel detection.

The second determining module 220 is configured to determine the reference time domain unit based on the number of pieces of target information.

Optionally, the target information includes one of:

downlink data information that the base station requires a terminal to feed back a Hybrid Automatic Repeat request (HARQ) result;

HARQ result information needed to be fed back by the terminal; or feedback information respectively corresponding to at least one HARQ process identifier.

Figure 8:
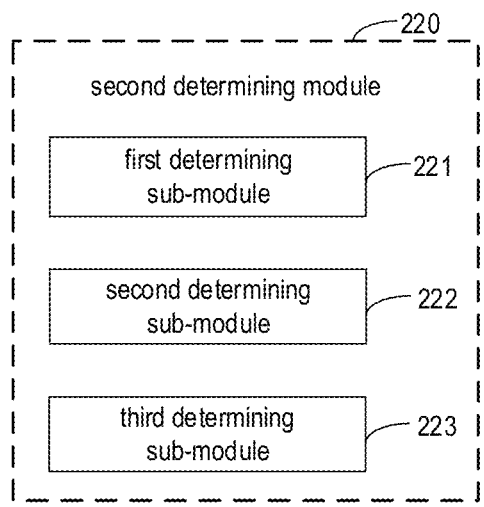
FIG. 8 is a block diagram illustrating another apparatus for determining a reference time domain unit according to an exemplary embodiment.

As illustrated in FIG. 8, FIG. 8 is a block diagram illustrating another apparatus for determining a reference time domain unit according to embodiments illustrated in FIG. 7. The second determining module 220 includes: a first determining sub-module 221, a second determining sub-module 222, and a third determining sub-module 223.

The first determining sub-module 221 is configured to determine a first time domain unit, within the target COT, that the number of pieces of target information is greater than a preset threshold as the reference time domain unit, in response to the target information including the downlink data information that the base station requires the terminal to feed back the HARQ result or the HARQ result information needed to be fed back by the terminal.

The second determining sub-module 222 is configured to determine each time domain unit, within the COT, that the number of pieces of target information is greater than the preset threshold as the reference time domain unit.

The third determining sub-module 223 is configured to determine a time domain unit, within the COT, that the number of pieces of target information is maximum as the reference time domain unit.

Figure 9:
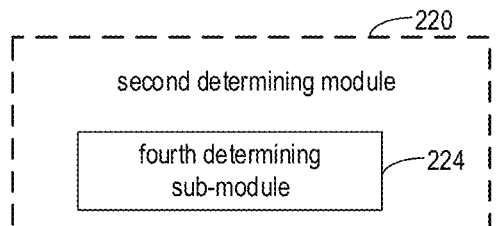
FIG. 9 is a block diagram illustrating another apparatus for determining a reference time domain unit according to an exemplary embodiment.

As illustrated in FIG. 9, FIG. 9 is a block diagram illustrating another apparatus for determining a reference time domain unit according to embodiment illustrated in FIG. 7. The second determining module 220 includes: a fourth determining sub-module 224.

The fourth determining sub-module 224 is configured to determine each time domain unit including the target information as the reference time domain unit, in response to the target information including the feedback information respectively corresponding to the at least one HARQ process identifier.

Figure 10:
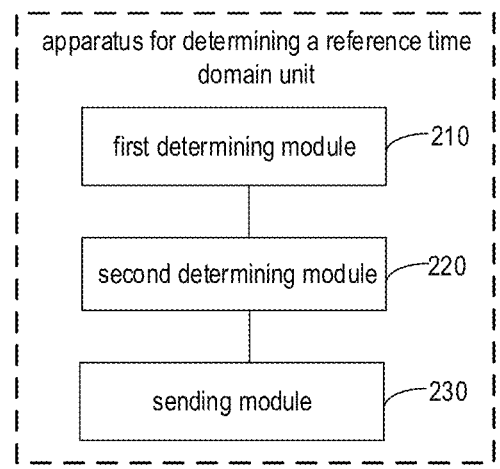
FIG. 10 is a block diagram illustrating another apparatus for determining a reference time domain unit according to an exemplary embodiment.

As illustrated in FIG. 10, FIG. 10 is a block diagram illustrating another apparatus for determining a reference time domain unit according to embodiments illustrated in FIG. 7. The apparatus further includes: a sending module 230.

The sending module 230 is configured to send indication information to the terminal through a target signaling, in which the indication information includes an identifier of the reference time domain unit.

Since the device embodiments basically correspond to the method embodiments, reference may be made to partial descriptions of the method embodiments for related parts. The device embodiments described above are only exemplary, in which the units described as separate components may or may not be physically separated, and the components shown as units may or may not be physical units, that is, the components may be located in one place, or distributed over multiple network units. Some or all of the modules can be selected according to actual needs to achieve the purpose of the solution of the disclosure. Those of ordinary skill in the art can understand and implement the solution without inventive works.

Correspondingly, the disclosure also provides a computer-readable storage medium. The storage medium has a computer program stored thereon. the computer program is configured to execute any of the method for determining a reference time domain unit.

Correspondingly, the disclosure also provides an apparatus for determining a reference time domain unit. The apparatus is applied to a target device operating on an unlicensed spectrum. the apparatus includes: a processor and a memory for storing processor-executable instructions. The processor is configured to: determine the number of pieces of target information included in each time domain unit within a target channel occupation time (COT), in which the target COT is a first COT just before the target device initiates channel detection; and determine the reference time domain unit based on the number of pieces of target information.

Figure 11:
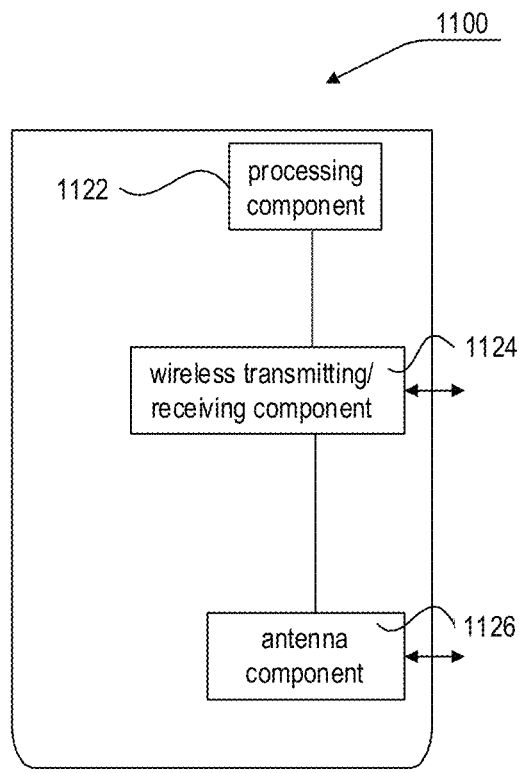
FIG. 11 is a schematic diagram illustrating an apparatus for determining a reference time domain unit according to an exemplary embodiment of the disclosure.

As illustrated in FIG. 11, FIG. 11 is a schematic diagram illustrating an apparatus 1100 for determining a reference time domain unit according to an exemplary embodiment. The apparatus 1100 may be provided as a target device, which may be a base station. As shown in FIG. 11, the apparatus 1100 includes a processing component 1122, a wireless transmit/receive component 1124, an antenna component 1126, and a signal processing portion specific to a wireless interface, and the processing component 1122 may further include one or more processor.

One of the processors in the processing component 1122 may be configured to perform any of the methods of determining a reference time domain unit described above.

Figure 12:
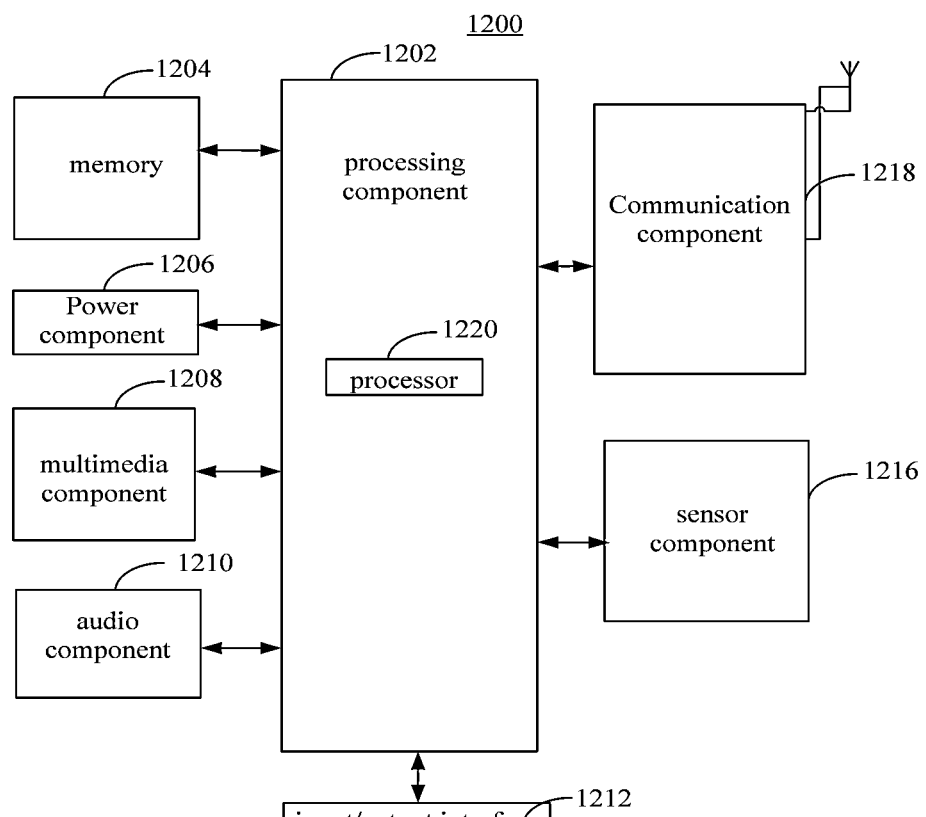
FIG. 12 is a schematic diagram illustrating another apparatus for determining a reference time domain unit according to an exemplary embodiment of the disclosure.

As illustrated in FIG. 12, FIG. 12 is a block diagram illustrating an electronic device 1200 for determining a reference time domain unit according to an exemplary embodiment. For example, the electronic device 1200 may be a terminal such as a mobile phone, a tablet computer, an e-book reader, a multimedia playback device, a wearable device, and a vehicle-mounted terminal.

As illustrated in FIG. 12, the apparatus 1200 may include one or more of the following components: a processing component 1202, a memory 1204, a power component 1206, a multimedia component 1208, an audio component 1210, an input/output (I/O) interface 1212, a sensor component 1216, and a communication component 1218.

The processing component 1202 generally controls overall operation of the apparatus 1200, such as the operations associated with display, telephone calls, data communications, camera operations, and recording operations. The processing component 1202 may include one or more processors 1220 to execute instructions to perform all or part of the steps in the above described method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202. For example, the processing component 1202 may read executable instructions from the memory to implement the method for determining a reference time domain unit provided by the above embodiments.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the multimedia component 1208 includes a front-facing camera and/or a rear-facing camera. When the apparatus 1200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1218. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1216 includes one or more sensors to provide status assessments of various aspects of the apparatus 1200. For instance, the sensor component 1216 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1216 may include a proximity sensor configured to detect the presence of nearby objects without any physical contact. The sensor component 1216 may also include a light sensor, such as a CMOS or CCD image sensor, for use in imaging applications. In some embodiments, the sensor component 1216 may also include an accelerometer sensor, a gyroscope sensor, a magnetic sensor, a pressure sensor, or a temperature sensor.

The communication component 1218 is configured to facilitate communication, wired or wirelessly, between the apparatus 1200 and other devices. The apparatus 1200 can access a wireless network based on a communication standard, such as WiFi, 2G, or 3G, or a combination thereof. In an exemplary embodiment, the communication component 1218 receives a broadcast signal or broadcast associated information from an external broadcast management system via a broadcast channel.

In an exemplary embodiment, the communication component 1218 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 1204, executable by the processor 1220 in the apparatus 1200, for performing the above method.

For example, the non-transitory computer-readable storage medium may be a ROM, a RAM, a CD-ROM, a magnetic tape, a floppy disc, an optical data storage device, and the like.

In embodiments of the disclosure, the target device operating on the unlicensed spectrum can determine the number of pieces of target information included in each time domain unit within the target COT. The target COT is a first COT just before the target device initiates channel detection. The target device may determine the reference time domain unit on the unlicensed spectrum based on the number of pieces of target information. Embodiments of the disclosure can determine the reference time domain unit on the unlicensed spectrum, such that the value of the Contention Window Size (CWS) can be adjusted accurately, and the performance of the NR-U system can be improved.

In embodiments of the disclosure, optionally, the target information may include the downlink data information that the base station requires the terminal to feed back the HARQ result, the HARQ result information needed to be fed back by the terminal, or the feedback information respectively corresponding to at least one HARQ process identifier. Therefore, on the unlicensed spectrum, the reference time domain unit can be determined based on the number of pieces of different target information, such that the value of the CWS can be adjusted accurately, and the performance of the NR-U system can be improved.

In embodiments of the disclosure, if the target information includes the downlink data information that the base station requires the terminal to feed back the HARQ result or the HARQ result information needed to be fed back by the terminal, the target device may determine each time domain unit, within the target COT, that the number of pieces of the target information is greater than the preset threshold as the reference time domain unit. Alternatively, the target device may determine each time domain unit, within the target COT, that the number of pieces of target information is greater than the preset threshold as the reference time domain unit. Alternatively, the target device may determine each time domain unit, within the target COT, that the number of pieces of target information is maximum as the reference time domain unit. Therefore, the reference time domain unit can be determined flexibly, the value of CWS can be adjusted accurately, the performance of the NR-U system is improved, and the availability is high.

In embodiment of the disclosure, the target device determines each time domain unit including the target information as the reference time domain unit, in response to the target information including the feedback information respectively corresponding to the at least one HARQ process identifier. The purpose of determining the reference time domain unit on the unlicensed spectrum is realized, the value of the CWS is adjusted accurately, the performance of the NR-U system is improved, and the availability is high.

In embodiment of the disclosure, the target device may send the indication information to the terminal through the target signaling to send the identifier of the reference time domain unit to the terminal through the indication information. Before the terminal sends the uplink data, the mechanism for the channel detection can be determined based on the target information carried in the reference time domain unit, and the availability is high.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a reference time domain unit, executed by a target device operating on an unlicensed spectrum, comprising:
    determining the number of pieces of target information included in each time domain unit within a target channel occupation time (COT), wherein the target COT is a first COT just before the target device initiates channel detection; and
    determining the reference time domain unit based on the number of pieces of target information;
    wherein the target information comprises: downlink data information that a base station requires a terminal to feed back a Hybrid Automatic Repeat Request (HARQ) result; and
    wherein determining the reference time domain unit based on the number of pieces of target information comprises: determining a first time domain unit, within the target COT, that the number of pieces of target information is greater than a preset threshold as the reference time domain unit, in response to the target information comprising the downlink data information that the base station requires the terminal to feed back the HARQ result or the HARQ result information needed to be fed back by the terminal.

2. The method according to claim 1, wherein the target information comprises one of:
    HARQ result information needed to be fed back by the terminal; or
    feedback information respectively corresponding to at least one HARQ process identifier.

3. The method according to claim 2, wherein determining the reference time domain unit based on the number of pieces of target information comprises:
    determining each time domain unit, within the COT, that the number of pieces of target information is greater than the preset threshold as the reference time domain unit; or
    determining a time domain unit, within the COT, that the number of pieces of target information included is maximum as the reference time domain unit.

4. The method according to claim 2, wherein determining the reference time domain unit based on the number of pieces of target information comprises:
    determining each time domain unit comprising the target information as the reference time domain unit, in response to the target information comprising the feedback information respectively corresponding to the at least one HARQ process identifier.

5. The method according to claim 1, comprising:
    sending indication information to the terminal through a target signaling, wherein the indication information comprises an identifier of the reference time domain unit.

6. A non-transitory computer-readable storage medium, wherein the storage medium has a computer program stored thereon, and the computer program is configured to execute the method for determining a reference time domain unit, the method comprising:
    determining the number of pieces of target information included in each time domain unit within a target channel occupation time (COT), wherein the target COT is a first COT just before the target device initiates channel detection; and
    determining the reference time domain unit based on the number of pieces of target information;
    wherein the target information comprises: downlink data information that a base station requires a terminal to feed back a Hybrid Automatic Repeat Request (HARQ) result; and
    wherein determining the reference time domain unit based on the number of pieces of target information comprises: determining a first time domain unit, within the target COT, that the number of pieces of target information is greater than a preset threshold as the reference time domain unit, in response to the target information comprising the downlink data information that the base station requires the terminal to feed back the HARQ result or the HARQ result information needed to be fed back by the terminal.

7. An apparatus for determining a reference time domain unit, comprising:
    a processor;
    a memory for storing processor-executable instructions;
    wherein,
    the processor is configured to:
    determine the number of pieces of target information included in each time domain unit within a target channel occupation time (COT), wherein the target COT is a first COT just before the target device initiates channel detection; and
    determine the reference time domain unit based on the number of pieces of target information;
    wherein the target information comprises: downlink data information that a base station requires a terminal to feed back a Hybrid Automatic Repeat Request (HARQ) result; and
    wherein the processor is configured to: determine a first time domain unit, within the target COT, that the number of pieces of target information is greater than a preset threshold as the reference time domain unit, in response to the target information comprising the downlink data information that the base station requires the terminal to feed back the HARQ result or the HARQ result information needed to be fed back by the terminal.

8. The non-transitory computer-readable storage medium according to claim 6, wherein the target information comprises one of:
    HARQ result information needed to be fed back by the terminal; or
    feedback information respectively corresponding to at least one HARQ process identifier.

9. The non-transitory computer-readable storage medium according to claim 8, wherein determining the reference time domain unit based on the number of pieces of target information comprises:
  determining each time domain unit, within the COT, that the number of pieces of target information is greater than the preset threshold as the reference time domain unit; or
  determining a time domain unit, within the COT, that the number of pieces of target information included is maximum as the reference time domain unit.

10. The non-transitory computer-readable storage medium according to claim 8, wherein determining the reference time domain unit based on the number of pieces of target information comprises:
  determining each time domain unit comprising the target information as the reference time domain unit, in response to the target information comprising the feedback information respectively corresponding to the at least one HARQ process identifier.

11. The non-transitory computer-readable storage medium according to claim 6, wherein the method further comprises:
  sending indication information to the terminal through a target signaling, wherein the indication information comprises an identifier of the reference time domain unit.

12. The apparatus according to claim 7, wherein the target information comprises one of:
  HARQ result information needed to be fed back by the terminal; or
  feedback information respectively corresponding to at least one HARQ process identifier.

13. The apparatus according to claim 12, wherein the processor is further configured to:
  determine each time domain unit, within the COT, that the number of pieces of target information is greater than the preset threshold as the reference time domain unit; or
  determine a time domain unit, within the COT, that the number of pieces of target information included is maximum as the reference time domain unit.

14. The apparatus according to claim 12, wherein the processor is further configured to:
  determine each time domain unit comprising the target information as the reference time domain unit, in response to the target information comprising the feedback information respectively corresponding to the at least one HARQ process identifier.

15. The apparatus according to claim 7, wherein the processor is further configured to:
  send indication information to the terminal through a target signaling, wherein the indication information comprises an identifier of the reference time domain unit.

16. The method according to claim 1, wherein the reference time domain unit comprises a symbol, a slot, a sub-frame, or a radio frame.

17. The non-transitory computer readable storage medium according to claim 6, wherein the reference time domain unit comprises a symbol, a slot, a sub-frame, or a radio frame.

18. The apparatus according to claim 7, wherein the reference time domain unit comprises a symbol, a slot, a sub-frame, or a radio frame.

* * * * *